(12) United States Patent
John et al.

(10) Patent No.: US 7,107,434 B2
(45) Date of Patent: Sep. 12, 2006

(54) SYSTEM, METHOD AND APPARATUS FOR ALLOCATING HARDWARE RESOURCES USING PSEUDORANDOM SEQUENCES

(75) Inventors: Lizy Kurian John, Austin, TX (US); Srivatsan Srinivasan, Sunnyvale, CA (US)

(73) Assignee: Board of Regents, The University of Texas, Austin, TX (US)

( * ) Notice: Subject to any disclaimer, the term of this patent is extended or adjusted under 35 U.S.C. 154(b) by 432 days.

(21) Appl. No.: 09/741,616

(22) Filed: Dec. 19, 2000

(65) Prior Publication Data

US 2002/0174321 A1    Nov. 21, 2002

Related U.S. Application Data

(60) Provisional application No. 60/172,655, filed on Dec. 20, 1999.

(51) Int. Cl.
*G06F 9/30* (2006.01)
*G06F 9/50* (2006.01)

(52) U.S. Cl. .................................. 712/219; 712/211
(58) Field of Classification Search ................. 712/208, 712/23, 211, 223, 300, 227, 26, 213, 219; 711/157, 216, 217; 714/701, 728, 739; 708/256, 708/250, 104; 780/46; 718/104; 380/46
See application file for complete search history.

(56) References Cited

U.S. PATENT DOCUMENTS

| 5,323,338 | A | * | 6/1994 | Hawthorne | ................. 708/250 |
|---|---|---|---|---|---|
| 5,490,280 | A | * | 2/1996 | Gupta et al. | ................... 712/23 |
| 5,530,837 | A | * | 6/1996 | Williams et al. | ............. 711/157 |
| 5,584,037 | A | | 12/1996 | Papworth et al. | ........... 395/800 |
| 5,651,123 | A | * | 7/1997 | Nakagawa et al. | ......... 712/208 |
| 5,651,125 | A | | 7/1997 | Witt et al. | ................... 395/394 |
| 5,754,603 | A | | 5/1998 | Thomas et al. | ............. 375/367 |
| 5,778,245 | A | | 7/1998 | Papworth et al. | ........... 395/800 |
| 5,781,470 | A | * | 7/1998 | Sourgen et al. | ........ 365/185.04 |
| 5,802,339 | A | | 9/1998 | Sowadsky et al. | .......... 395/393 |
| 5,867,683 | A | | 2/1999 | Witt et al. | ................... 395/394 |
| 5,872,951 | A | | 2/1999 | Tran | ........................... 395/394 |
| 5,884,059 | A | | 3/1999 | Favor et al. | ................. 395/391 |
| 6,038,585 | A | * | 3/2000 | Togawa | ...................... 718/100 |
| 6,266,413 | B1 | * | 7/2001 | Shefi | ........................... 380/46 |
| 6,389,562 | B1 | * | 5/2002 | Kondo et al. | ................ 714/701 |
| 6,507,808 | B1 | * | 1/2003 | LaFauci | ........................ 703/20 |

OTHER PUBLICATIONS

"Input/output processor", computerhope.com, Computer Hope, 1998-2005.*

* cited by examiner

*Primary Examiner*—Daniel H. Pan
(74) *Attorney, Agent, or Firm*—Chalker Flores, LLP; Daniel J. Chalker

(57) ABSTRACT

The present invention provides a system, method and apparatus for allocating resources by assigning resource identifiers to processor resources using at least a portion of a pseudorandom sequence. One or more resource identifiers are generated using at least a portion of each a pseudorandom sequence. Each resource identifier corresponds to one of the resources. One or more of the resource identifiers are then selected for allocation to the instruction.

40 Claims, 8 Drawing Sheets

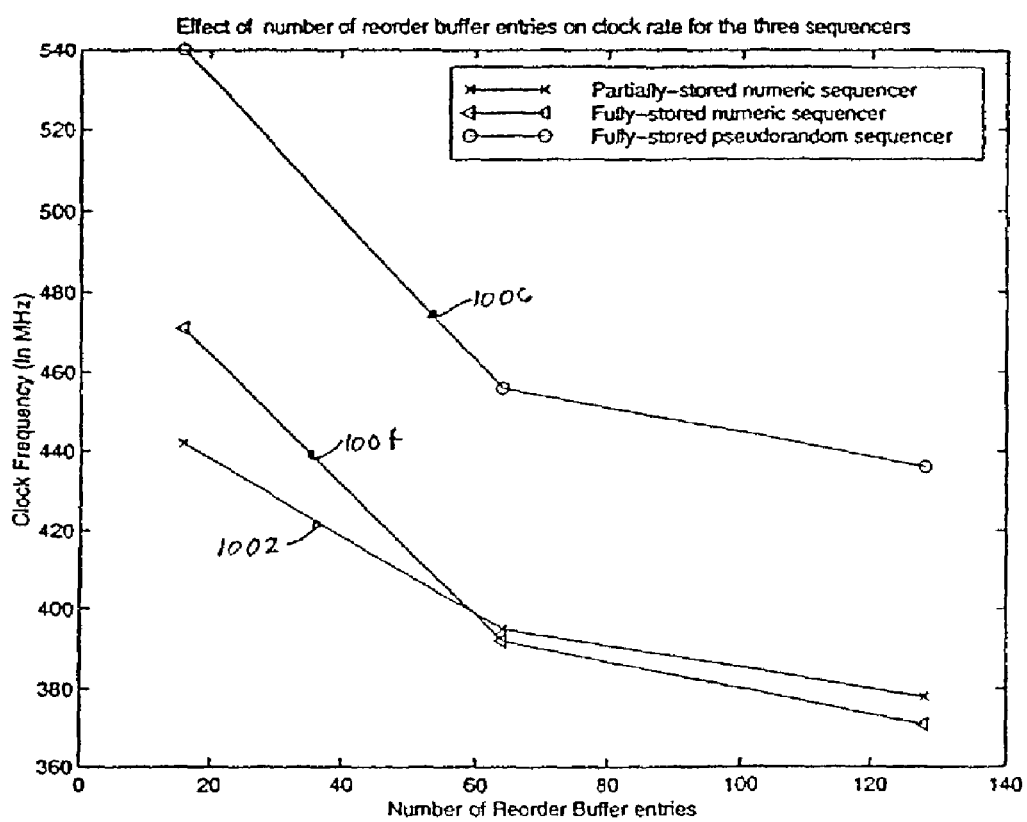
Figure 10: Effect of number of reorder buffer entries on clock rate for the three sequencers

SYSTEM, METHOD AND APPARATUS FOR ALLOCATING HARDWARE RESOURCES USING PSEUDORANDOM SEQUENCES

TECHNICAL FIELD OF THE INVENTION

This application is a conversion from and claims priority of U.S. Provisional Application No. 60/172,655, filed on Dec. 20, 1999.

The present invention relates in general to the field of computer systems, and more particularly, to a system, method and apparatus for allocating hardware resources within a computer processor using pseudorandom sequences.

BACKGROUND OF THE INVENTION

Without limiting the scope of the invention, this background of the invention is described in connection with microprocessor resource allocators, as an example. Modern microprocessors are designed to simultaneously issue and execute several instructions in a single clock cycle using a variety of techniques, such as pipelining, dynamic scheduling, speculative execution and out of order execution. Each technique for improving total instruction throughput generally relies on additional hardware structures such as load buffers, store buffers, and reorder buffers. One or more reorder buffers may be present in a modern processor, facilitating speculative execution and out of order execution, and providing additional resources to issued instructions.

A number of resource identifiers and tags are used in modern processing devices to manage the various processor resources, correctly identify and enforce data dependencies and to keep track of the instructions that are issued and completed. Where the hardware structures are buffers, such as the reorder buffer, hardware identifiers are utilized to allocate new buffer entries and tags, to identify and match existing entries, and to replace tags with values. A number of resource identifiers are generally associated with a single hardware structure and together, the group of identifiers forms a sequence. Each resource identifiers in the sequence identifies an element of the associated hardware structure and allocates the element to issued instructions. Thus, the resource identifiers are associated with instructions and are allocated in sequence order using a resource allocator.

A resource allocator may generate and allocate resource identifiers in numeric order by using adders to generate the next identifier in numeric sequence or by storing the sequence and indexing resource identifiers within the stored sequence after determining which identifier had been most recently allocated. Because the resource allocator is in the critical path of the decoder stage of most modern microprocessors, it is desirable to minimize the speed with which identifiers are generated and resources are allocated.

Accordingly, it would be desirable to increase resource allocation efficiency within an advanced microprocessor. It would be advantageous to decrease the number of logic levels necessary to generate and allocate resource identifiers. It would further be beneficial to generate and allocate resource identifiers using a nonnumeric sequence.

SUMMARY OF THE INVENTION

The present invention provides a system, method and apparatus for allocating hardware resources using pseudorandom sequences. The apparatus includes a sequence generator coupled to a resource identifier selector. The sequence generator generates one or more resource identifiers using at least a portion of a pseudorandom sequence. The resource identifier selector selects one or more of the resource identifiers for allocation to the instruction.

The method includes the steps of generating one or more resource identifiers using at least a portion of a pseudorandom sequence and selecting one or more of the resource identifiers for allocation to the instruction. Each resource identifier corresponds to one of the resources.

The system includes a memory storage device, a bus coupled to the memory storage device and a processor coupled to the bus. The processor includes a resource allocator having a sequence generator and a resource identifier selector. The sequence generator generates one or more resource identifiers using at least a portion of a pseudorandom sequence. Each resource identifier corresponds to one of the resources. The resource identifier selector selects one or more of the resource identifiers for allocation to the instruction.

Other features and advantages of the present invention shall be apparent to those of ordinary skill in the art upon reference to the following detailed description taken in conjunction with the accompanying drawings.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 10 shows the plot of clock frequency of the three sequencers for different number of entries of four-ported reorder buffer.

DETAILED DESCRIPTION OF THE INVENTION

While the making and using of various embodiments of the present invention are discussed in detail below, it should be appreciated that the present invention provides many applicable inventive concepts that may be embodied in a wide variety of specific contexts. The specific embodiments discussed herein are merely illustrative of specific ways to make and use the invention and do not delimit the scope of the invention.

Figure 1:
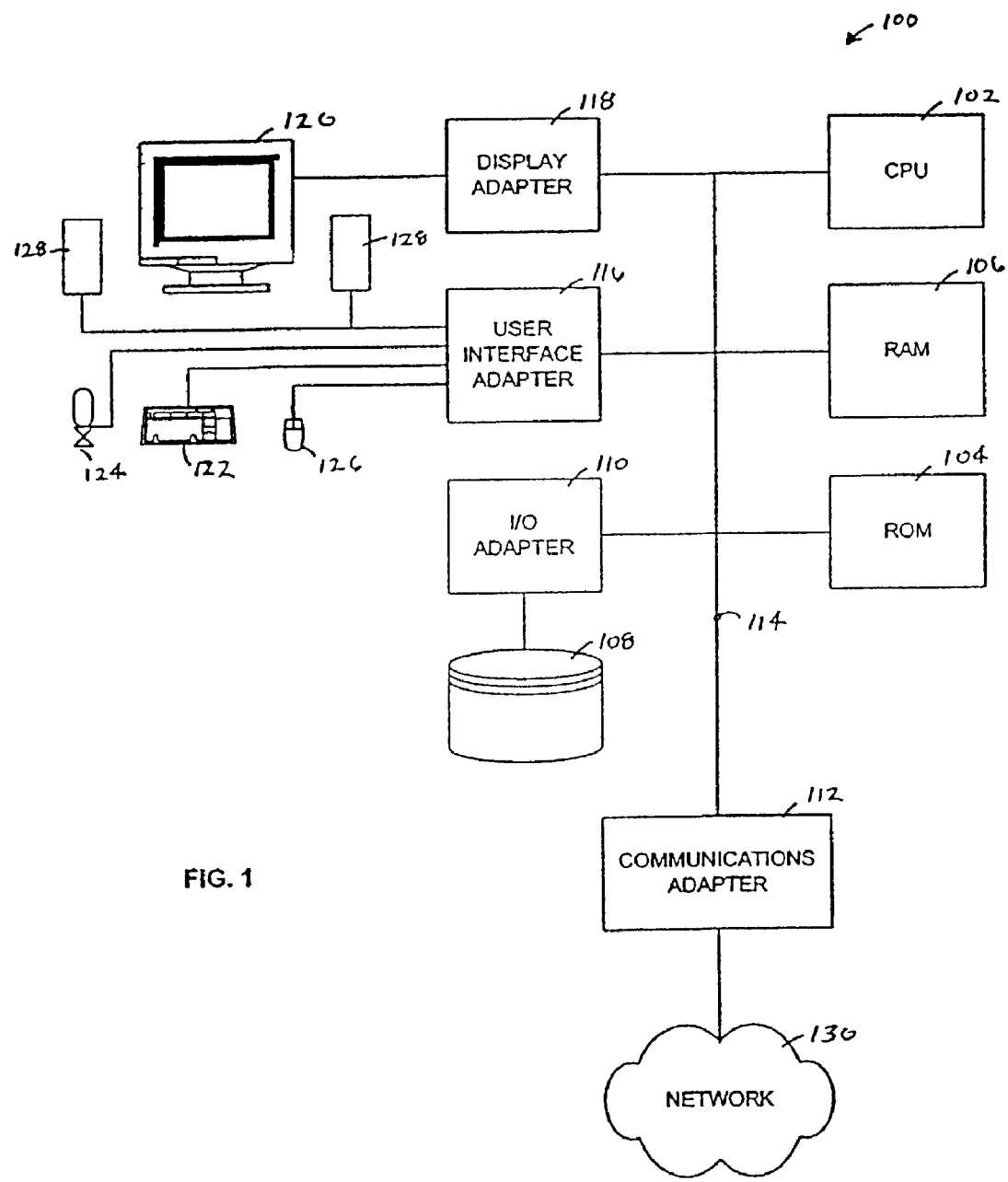
FIG. 1 is a high-level block diagram of a data processing system in which a processing device and resource allocator in accordance with an embodiment of the present invention may operate.

Referring to FIG. 1, a high-level block diagram of a data processing system 100, such as a main-frame computer, workstation or personal computer, in which an embodiment of the present invention may operate is shown. The data processing system 100 includes a central processing unit ("CPU") 102 coupled to a random access memory ("RAM") 106 via a bus 114. The CPU 102 is also coupled to a read-only memory ("ROM") 104 via bus 114. In addition, one or more peripheral storage devices 108, such as a disk storage unit, are coupled to bus 114 via an input/output ("I/O") adapter 110. Similarly, a keyboard 122, a mouse 126 or other cursor manipulation device, a microphone 124, and speakers 128 are coupled to bus 114 via a user interface adapter 116. Likewise, a display device 120 is coupled to bus 114 via a display adapter 118 to facilitate user interaction with data processing system 100. Data processing system 100 may also include a communications adapter 112 that allows communication with other data processing systems (not shown) via a communications network 130. CPU 102 interacts with the various elements of the data processing system 100 by executing an operating system, such as the Microsoft Windows®, MAC OS or UNIX stored within the disk storage unit 108, RAM 106 and/or ROM 104.

Figure 2:
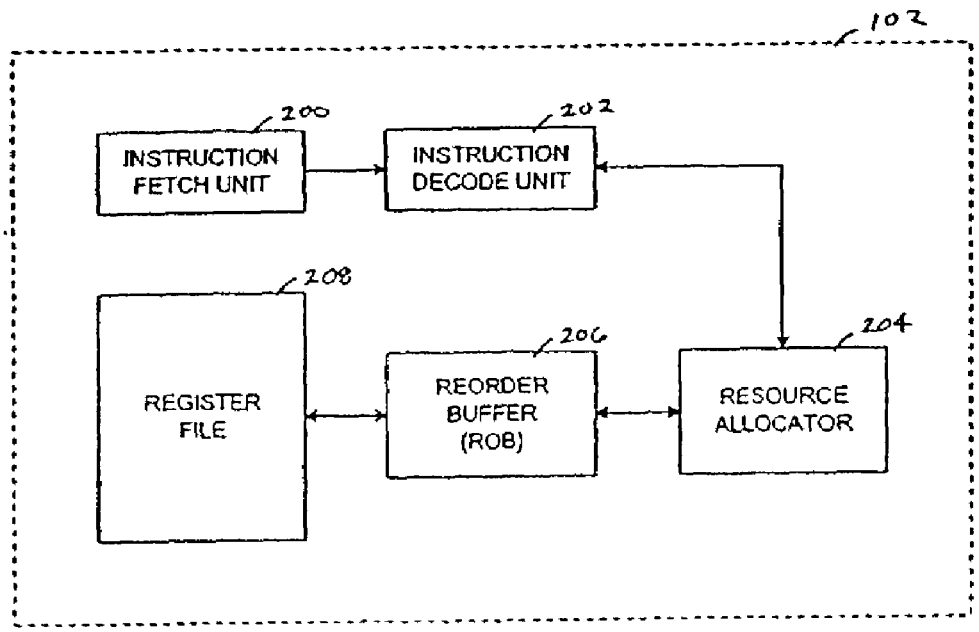
FIG. 2 is a high-level block diagram of the processor illustrated in FIG. 1.

Now referring to FIG. 2, a high-level block diagram of the CPU 102 of FIG. 1 is shown. CPU 102 may contain, among other components, an instruction fetch unit 200 capable of retrieving one or more instructions from memory 106 (FIG. 1) or from an alternate location. Fetched instructions are then transmitted to and decoded by instruction decode unit 202. It will be appreciated that multiple instructions can be fetched and decoded simultaneously without departing from the method and system of the present invention. Instruction decode unit 202 then communicates the data necessary to determine instruction resource requirements to resource allocator 204, which in turn relates information regarding available resources to the respective instructions in the form of resource identifiers, resulting in resource allocation.

One possible resource depicted in FIG. 2 is reorder buffer 206 coupled to resource allocator 204. Other possible resources may include load and store buffers as well as various other processor-accessible resources. Reorder buffer 206 operates to map registers within register file 208 to the larger physical register set of the reorder buffer 206, facilitating register renaming, speculative and out-of-order execution. Following instruction retirement or any other occurrence resulting in resource deallocation, reorder buffer 206 may transmit data to resource allocator 204 including any information necessary to update an allocation bound present in the resource allocator 204.

A reorder buffer 206 operates by mapping the destination register specified by an issued instruction requiring a reorder buffer entry to a physical register present in the reorder buffer 206. This mapping or "register renaming" facilitates several of the above techniques. For example, by mapping the register set to a larger set of physical registers within the reorder buffer 206, exception recovery and speculative execution can be performed by disregarding error-generating or mis-predicted branch instruction execution without modifying the processor register file. This is possible because exceptions and branch mis-predicts can be discovered prior to instruction retirement and before the processor register set has been modified. Similarly, out of order execution and more efficient pipelining is made possible by examining issued instructions, removing false data dependencies, if possible, using register renaming, distributing the reordered instructions to one or more execution units and retiring the instructions in program order following execution.

Figure 3:
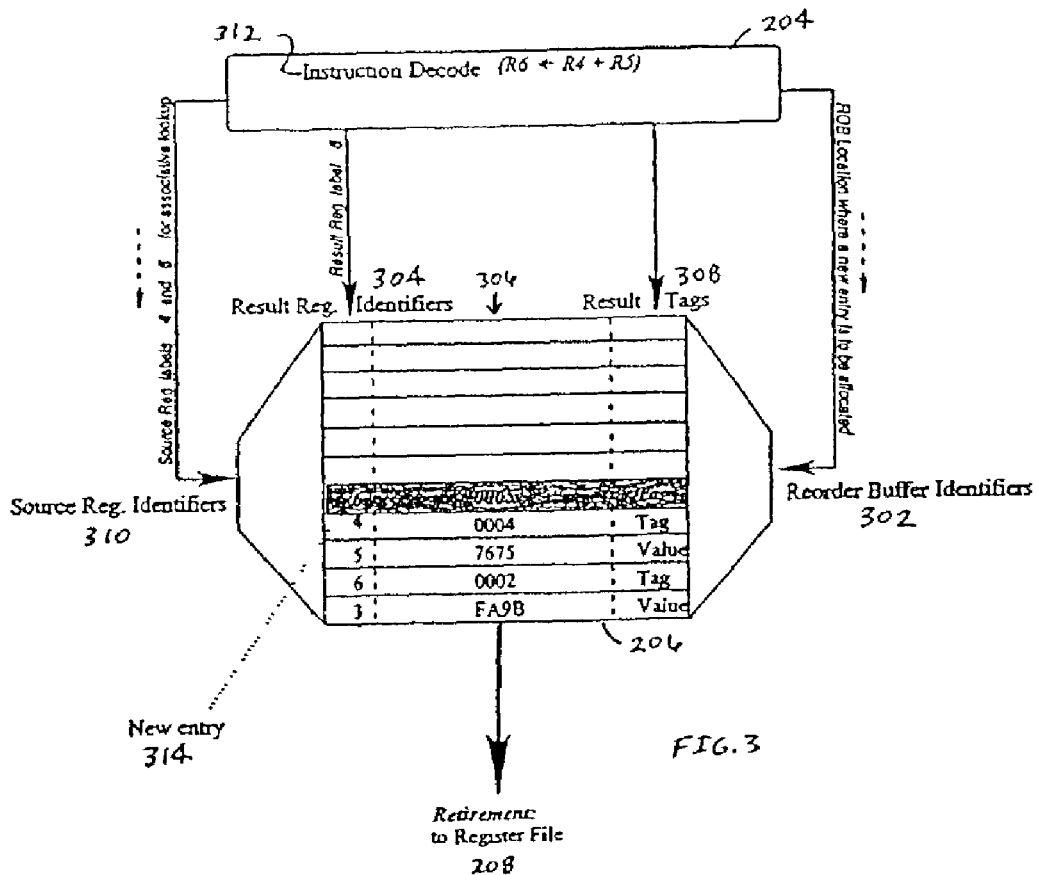
FIG. 3 illustrates the operation of the reorder buffer.

For example, FIG. 3 illustrates the operation of the reorder buffer 206. The reorder buffer 206 links several identifiers together to allow out of order processing. These identifiers are used to allocate new entries, to identify and to match the existing entries, and to replace a tag with a value in the reorder buffer 206. As a result, the speed of the reorder buffer 206 is dependent, in part, on how fast these identifiers can be generated. The reorder buffer identifier 302 is the location in the reorder buffer 206 where a new entry is to be allocated. The result register identifier 304 links the new entry to the register where the result 306 for the new entry is to be stored. The result tags 308 indicate whether the result 306 is a value or a tag. The source register identifier 310 links the new entry to one or more result register identifiers 304 that are used for associative look up.

During the instruction decode phase, the resource allocator 204 allocates resources to the decoded instruction 312, which in this example is R6←R4+R5, by creating reorder buffer entry 314. Also during instruction decode, the source operands or corresponding tags for each instruction have to be passed to the reservation station. To obtain operands, the reorder buffer 206 is associatively searched using the source register identifiers 310 of the decoded instructions. The source register identifiers 310 are compared to result register identifiers 304 of previous instructions stored in the reorder buffer 206. The source register identifier 310 for registers R4 and R5 are compared to the previous result register identifier 304. If the register number is found and a value is available, the corresponding entry is obtained. If, however, the value is not available, a result tag 308 is obtained. In this case, the value for register R5, which is 7675, and the tag for register R4, which is 0004, are obtained. In the case of multiple matches, the youngest matching entry is obtained. If the processor has a four instruction decoder, there should be four ports for result register identifiers 304, result tags 308 and reorder buffer identifiers 302, and eight source register identifiers 310. If fewer ports than this number are used, arbitration will be required for port access.

Figure 4A:
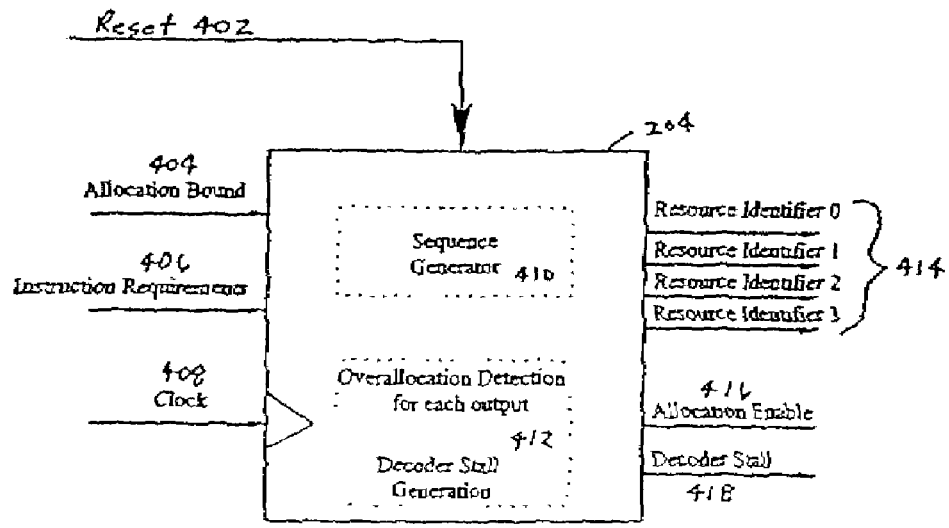
FIG. 4*a* is a symbolic view of a resource allocator.

Referring now to FIG. 4a, a symbolic view of a resource allocator 204 is shown. The resource allocator 204 can be integrated into data processing system 100 (FIG. 1) either directly within CPU 102 (FIG. 1) or as an independent device coupled to CPU 102 (FIG. 1) via a bus 114 (FIG. 1) and having four resource identifier outputs. It should be appreciated that a four port resource allocator is depicted in the figures for illustrative purposes only and a resource allocator capable of generating any number of resource identifiers may also be implemented in accordance with the present invention. Resource allocator 204 includes a number of control inputs including an allocation bound 404, instruction requirements 406, and a reset 402. Note that the reset 402 is not required to achieve the speed and performance results described herein. These control inputs 402, 404 and 406 are used to generate a group of resource identifiers 414 in each cycle defined by clock 408. Resource identifiers 414 are generated according to a predefined pattern or sequence by sequence generator 410 before being output as a group at resource identifier output 414. The resource allocator 204 also includes an overallocation detection circuit 412, which at the sensitive edge (rising or falling edge) or level (negative on positive) of the clock 408, compares the resource identifiers 414 with the allocation bound 404 to generate an allocation enable signal 416 and a decoder stall signal 418.

The resource identifiers 414 are generated by the sequence generator 410 using a numeric or non-numeric sequence. A numeric sequence generates the resource identifiers 414 in numeric order, e.g., start at 0 and run through 15 and roll back to 0. Although generating the resource identifiers 414 using a numeric sequence appears simple and efficient, the binary encoding of the numeric sequence does not necessarily lead to the faster resource allocation. Likewise, some non-numeric sequences, such as Gray code and weighted codes, are not suitable to achieve faster resource allocation. Faster resource allocation is important because the resource identifiers 414 are typically generated in one clock cycle and are not pipelined. As a result, the resource allocator 204 is typically part of the instruction decode critical path and should, therefore, operate as quickly as possible. Thus, the sequence used to generate the resource identifiers 414 can directly affect system performance.

Figure 4B:
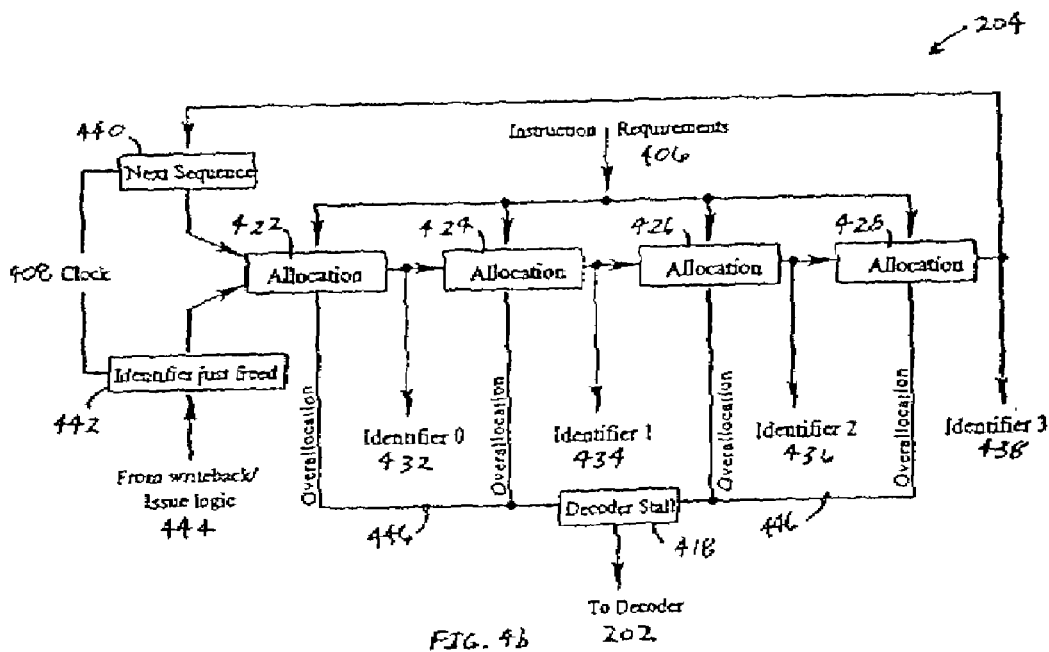
FIG. 4*b* is a high-level block diagram of a resource allocator.

Turning now to FIG. 4b, a high-level block diagram of a resource allocator 204 having multiple stages 422, 424, 426 and 428. These four stages 422, 424, 426 and 428 allow four instructions to be simultaneously decoded (one instruction per stage). In operation, inputs to the first allocation stage 422 include the instruction requirements 406 and the next identifier in sequence 440 as well as the last allocatable resource identifier in the sequence 442, which includes any recently deallocated resource identifiers from the writeback/issue logic 444. Note that the next identifier in sequence 440 is based on the most recently allocated identifier 438. Utilizing these inputs, the first allocation stage 422 generates a first resource identifier 432 corresponding to the first available resource entry. Thereafter, each of the subsequent allocation stages 424, 426 and 428 generate in-sequence resource identifiers using the instruction requirements 406 and the most recently allocated resource identifier received from the immediately preceding stage.

If the first instruction requires an entry in the reorder buffer 206 (FIG. 2) or other resource/hardware structure, the first allocation stage 422 generates the first available identifier 432 so that it may be associated or allocated to the first instruction and then passes that allocated first available identifier 432 to the next or second allocation stage 424. If, however, the first instruction does not require a resource and corresponding identifier, no identifier is generated by the first stage allocator 422 and the next identifier in sequence 440 is passed on to be used by a subsequent allocation stage 424, 426 or 428. In this manner, each of the four resource identifiers 432, 434, 436 and 438 can be generated in a single cycle of the clock 408. If insufficient resources are available at any of the stage of allocation, an overallocation signal 446 is generated that results in a decode stall signal 418 being transmitted to the instruction decoder 202 until sufficient resources are freed. Otherwise, the resource identifiers 432, 434, 436 and 438 are passed to the corresponding issued instructions. To prevent stalling the instruction decode unit 202, the pool of allocatable resources includes any resources freed in the previous allocation cycle 442 from the writeback/issue logic 444, so that the maximum number of available resources can be allocated.

As previously described, the resource identifiers 432, 434, 436 and 438 collectively form a sequence, which can be a numeric or non-numeric sequence. In addition, the resource identifiers 432, 434, 436 and 438 are typically small. For example, a 32-entry reorder buffer requires only a 5-bit identifier. If the top three entries in the reorder buffer 206 are empty, the resource allocator 204 will allocate those three entries to three out of the four instructions being decoded in the cycle.

Figure 5:
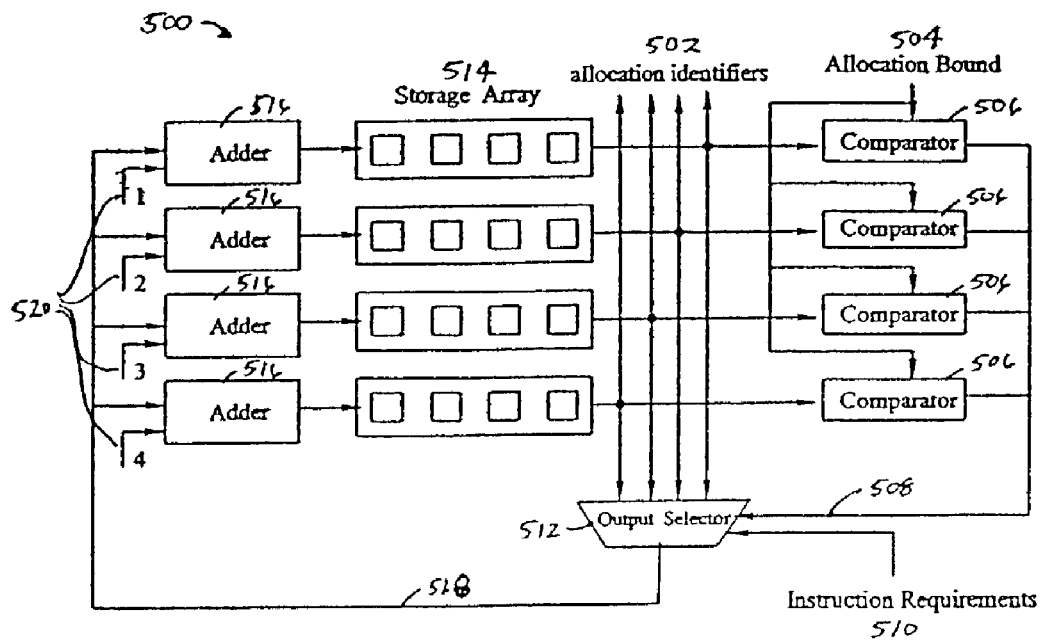
FIG. 5 is a block diagram of a partially-stored numeric sequence resource allocator.

Now referring to FIG. 5, the organization of a partially-stored, 4-bit, four-ported resource allocator 500 is illustrated. The resource allocator 500 uses adders 516 to implement a numeric sequence to generate the resource identifiers 502. To facilitate fast sequence generation, fast adders such as the Carry Look Ahead adder (CLA) may be used. It may also be observed that one operand 520 for each adder 516 is constant and special optimization techniques for fast addition can be applied. The four adders 516 operate in parallel to generate the next four sequences 502 following the highest resource identifier allocated 518 in the current clock cycle (if 0 follows 15, 0 is considered to be the higher of the two resource identifiers). Output selector 512 chooses the highest resource identifier allocated 518 that will be allocated during the cycle. The resource sequence output of the adders 516 is then written to the four storage array elements 514, which in turn output these sequences depending on the instruction requirements 510. Comparators 506 are used to determine whether an allocation bound 504 has been exceeded by each resource identifier allocated so that output selector 512 can present the correct highest resource identifier allocated 518 in the next cycle and stall the instruction decode unit 202 (FIG. 2). In each clock cycle therefore, depending on the allocation bound 504, and the requirements of the instructions 510, a new set of resource identifiers 502 are generated and stored in the storage arrays 514. By generating a set of resource identifiers 502 each cycle, the resource allocator 500 suffers from an identifier generation delay associated with even fast CLA or other optimized adders.

Table I compares the results of timing optimizations performed on two partially-stored numeric sequencers (for four-ported, 16-entry reorder buffer), one realized using the best automatically synthesized adders, and the other realized using optimized Carry LookAhead adders (CLA). The synthesized adders were observed to have better timing characteristics compared to the CLA.

TABLE I

Comparison of the Results of Synthesis of 4-bit, 16-entry Partially-stored Numeric Sequencers of FIG. 5 Using Best Synthesized Adders and Carry Lookahead Adders

|  | With the Best Synthesized Adders | With Carry LookAhead Adders |
| --- | --- | --- |
| Critical Path Timing (ns) | 2.26 | 2.55 |
| (Max. Clock Speed (MHz)) | (442) | (392) |
| Total Area* | 832.375 | 1218.7 |

*Equivalent gates: 1 two-input nand = 1 equivalent gate

Figure 6:
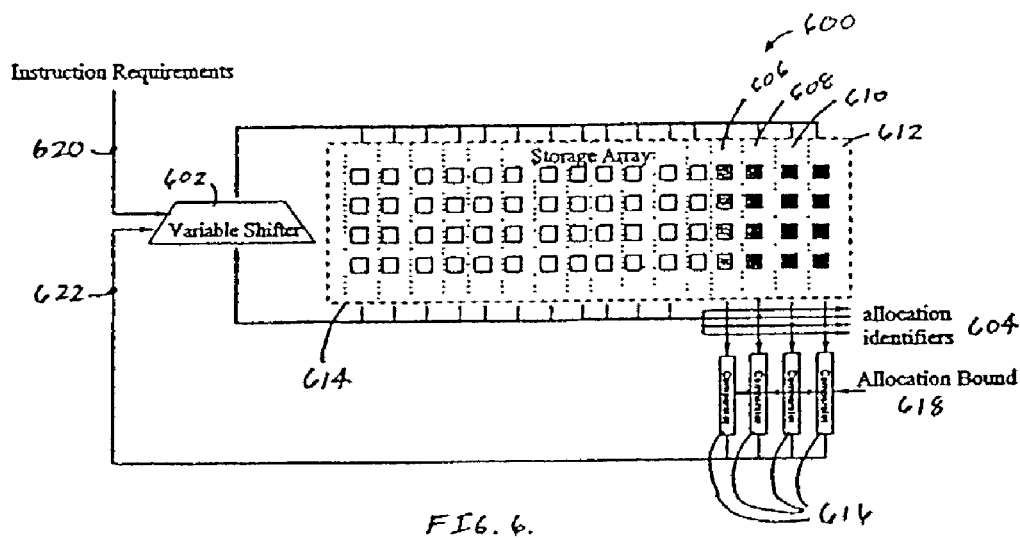
FIG. 6 is a block diagram of a fully-stored numeric sequence resource allocator.

Referring now to FIG. 6, a block diagram of a fully-stored numeric sequence resource allocator 600 is shown, which eliminates the identifier generation delay. The storage array 614 stores all the resource identifiers in order. The storage array 614 is then indexed appropriately every cycle to generate the next identifiers in the sequence. Since the next resource identifiers are indexed from the storage array 614 based on the highest identifier allocated in each cycle, a timing bottleneck lies predominantly in determining the highest resource identifier allocated in a given cycle.

The storage array 614 includes the first four allocatable resource identifiers 606, 608, 610 and 612 in the sequence coupled to an allocation identifier output 604. Each of the resource identifiers in storage array 614 is further coupled to and may be input to and output from a variable shifter 602. Depending on the requirements of a given instruction received at input 620, and any overallocation signals generated by one or more comparators 616, if any, received at signal input 622, identifiers for the next cycle 606, 608, 610 and 612 are generated by shifting the array 614 by an amount equal to the number of resource identifiers allocated in the current cycle of the clock (not shown). To efficiently allocate resources, the first allocated resource identifier of the next cycle should immediately follow the most recently allocated resource identifier (the last resource identifier allocated in the previous cycle). The variable shifter 602 is capable of performing one, two, three or four shifts (in the case of a four-port resource allocator) depending on the number of resources required. Comparators 616 determine whether the generated allocation identifiers 604 represent allocatable resources using an allocation bound 618. The allocation bound 618 represents the final allocatable resource identifier in the sequence so that resources are not incorrectly or over-allocated in the current cycle and so that correct resource identifiers are generated in the next cycle. The speed of sequence generation depends primarily on the speed of the variable shifter 602 and how quickly the most recently allocated resource identifier can be determined. This design requires a large multiplexer whose size depends on the number of entries in the storage array 614 and the number of bits in each array. A large multiplexer is usually composed of a number of smaller multiplexers, thus giving rise to a larger delay.

To generate resource identifiers as quickly as possible and consequently to allocate resource quickly and efficiently, a candidate sequence of resource identifiers should be generated using minimal levels of logic. A pseudorandom sequence is a non-numeric, maximal length sequence formed by a characteristic polynomial for a given n-bit number that can be realized quickly utilizing a Linear Feedback Shift Register (LFSR), and additional Exclusive-OR (XOR) and zero insertion logic. The zero insertion logic, while not required, is advantageous because the characteristic polynomial has the property of generating $2^n-1$ numbers and using the zero insertion circuit, it is possible to generate all $2^n$ numbers in the non-numeric sequence.

Table II below lists a 4-bit complete pseudorandom sequence using the characteristic polynomial $x^4+x+1$. In the pseudorandom sequence presented, the least significant bit of a successor sequence element is generated by XORing the most and least significant bits of the previous sequence element; while the three most significant bits of the successor are obtained by left-shifting the three least significant bits of the present stage. The all-zero state is then inserted into the sequence using the zero insertion circuit so that the hardware requirements of the resource allocator are lessened.

TABLE II

Complete 4-Bit Pseudorandom Sequence

| Bits | Hex |
| --- | --- |
| 0001 | 1 |
| 0011 | 3 |
| 0111 | 7 |
| 1111 | F |
| 1110 | E |
| 1101 | D |
| 1010 | A |
| 0101 | 5 |
| 1011 | B |
| 0110 | 6 |
| 1100 | C |
| 1001 | 9 |

TABLE II-continued

Complete 4-Bit Pseudorandom Sequence

| Bits | Hex |
| --- | --- |
| 0010 | 2 |
| 0100 | 4 |
| 1000 | 8 |
| 0000 | 0 |

Figure 7:
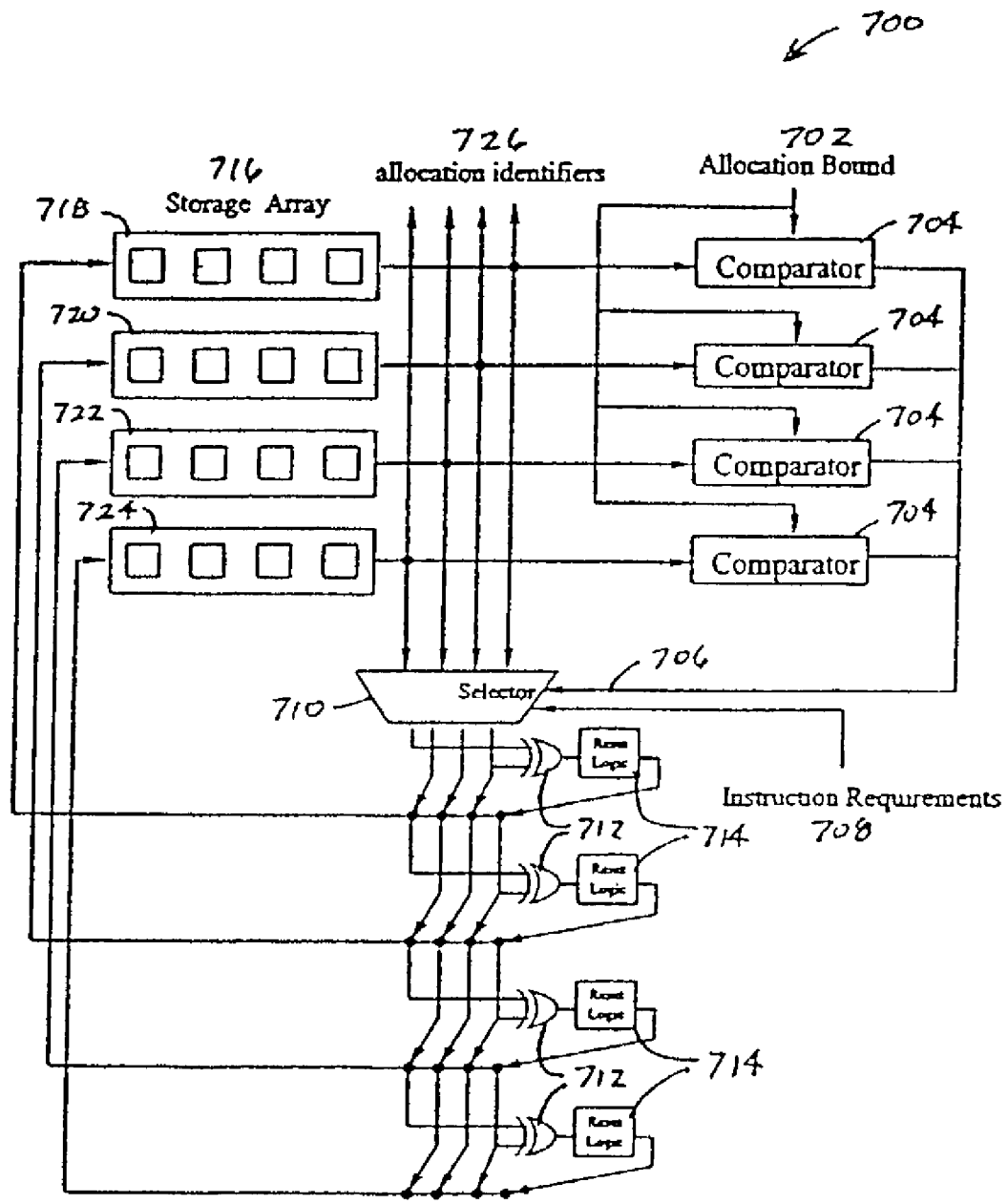
FIG. 7 is a block diagram of a partially-stored pseudorandom sequence resource allocator in accordance with the present invention.

FIG. 7 depicts a partially-stored resource allocator 700 in accordance with the present invention that is capable of generating the pseudorandom sequence of resource identifiers presented in Table II. In operation, selector 710 of resource allocator 700 selects and outputs the generated resource identifiers that will be transmitted via allocation identifier output 726 to be allocated instructions. The determination of selector 710 is based upon both the instruction requirements 708 as well as any overallocation signals generated by comparators 704. Allocation bound 702 is modified upon the deallocation of resources to reflect resources made available by instructions completed in the previous cycle. Comparators 704 can then utilize the allocation bound 702 and the current potentially allocated resource identifiers 726 to generate an overallocation signal 706 so that allocation of resources and instruction decoding can be stalled.

To generate the next group of resource identifiers, first, selector 710 is used to determine the most recently allocated resource identifier utilizing instruction requirements 708 and overallocation signal 706. Second, the three least significant bits of the most recently allocated identifier are shifted, becoming the three most significant bits of the next resource identifier in the pseudorandom sequence. Next, the most and least significant bits of the most recently allocated resource identifier are XOR'ed using XOR gate 712, and finally, the potential least significant bit output of XOR gate 712 is either validated by reset logic circuit 714, or a zero is inserted as the least significant bit at the appropriate sequence point. The process is repeated for each resource identifier generated in the clock cycle with each generated resource identifier being then stored sequentially in storage array 716 for later allocation.

Figure 8:
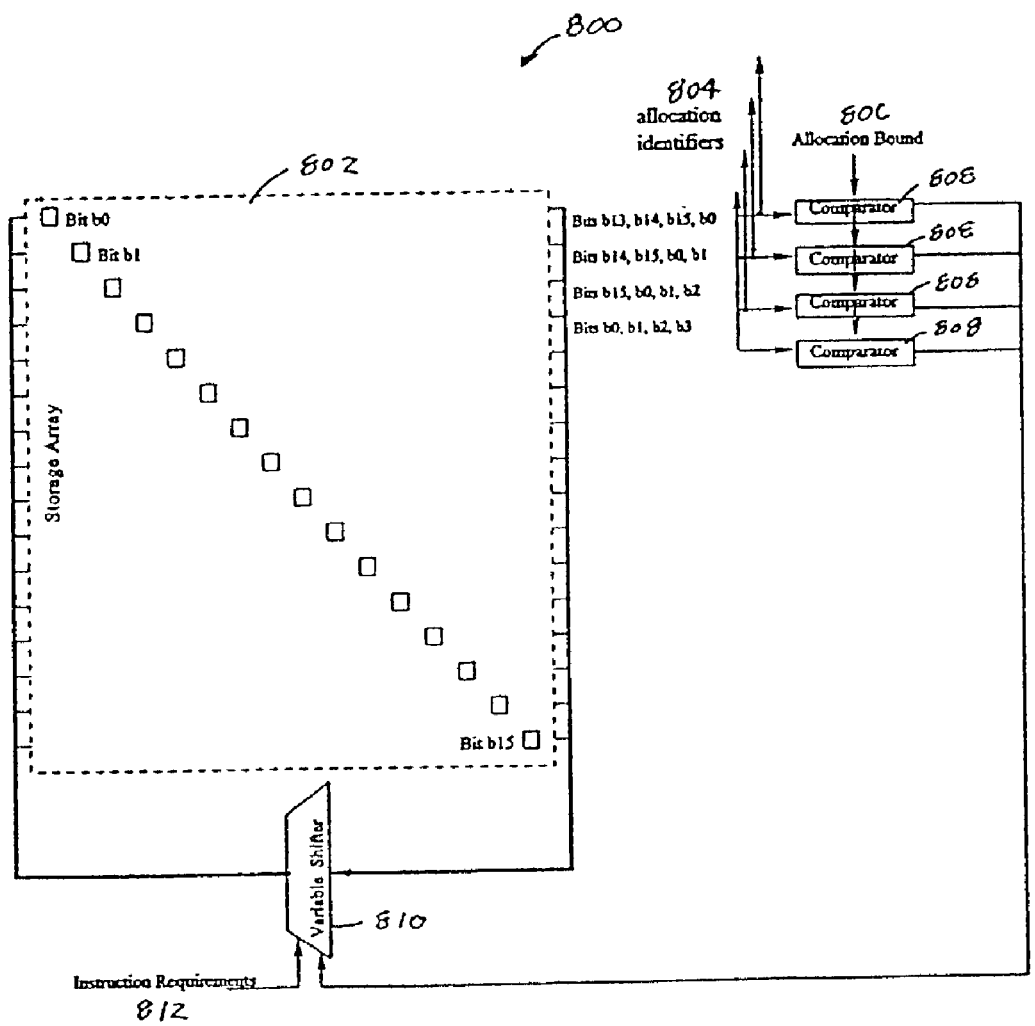
FIG. 8 is a block diagram of a fully-stored pseudorandom sequence resource allocator in accordance with the present invention.

Referring now to FIG. 8, a block diagram of a fully-stored pseudorandom sequence resource allocator in accordance with the present invention will now be described. Included within resource allocator 800 are storage array 802, variable shifter 810, and comparators 808. Resource allocator 800 operates in a manner similar to that of resource allocator 600 of FIG. 6 in that the fully-stored sequencer eliminates the delay associated with generating a group of resource identifiers each cycle by indexing an array in which the sequence is stored. A more efficient storage array 802 can be realized in resource allocator 800 by using a property of pseudorandom sequences. For example, in the pseudorandom sequence presented in Table II, only the least significant bit of a successor resource identifier must be computed rather than each bit of the next identifier. The remaining three most significant bits of the successor resource identifier can be obtained by shifting the current storage array element. Due to this property of pseudorandom sequences, the entire pseudorandom sequence can be represented by storing only the least significant bit of each resource identifier in the sequence. More specifically, Bit b0=0, Bit b1=0, Bit b2=0, Bit b3=1, Bit b4=1, Bit b5=1, Bit b6=1, Bit b7=0, Bit b8=1, Bit b9=0, Bit b13=0, Bit b14=1, and Bit b15=0. Accordingly, a smaller storage array 802 can be implemented and the size and complexity of the variable shifter 810 used can also be reduced.

The variable shifter 810 of resource allocator 800 selects and outputs the generated resource identifiers that will be transmitted via allocation identifier output 804 to be allocated to instructions. The determination of variable shifter 810 is based upon both the instruction requirements 812 as well as any overallocation signals generated by comparators 808. Allocation bound 806 is modified upon the deallocation of resources to reflect resources made available by instructions completed in the previous cycle. Comparators 808 can then utilize the allocation bound 806 and the current potentially allocated resource identifiers 804 to generate an overallocation signal so that allocation of resources and instruction decoding can be stalled.

Figure 9:
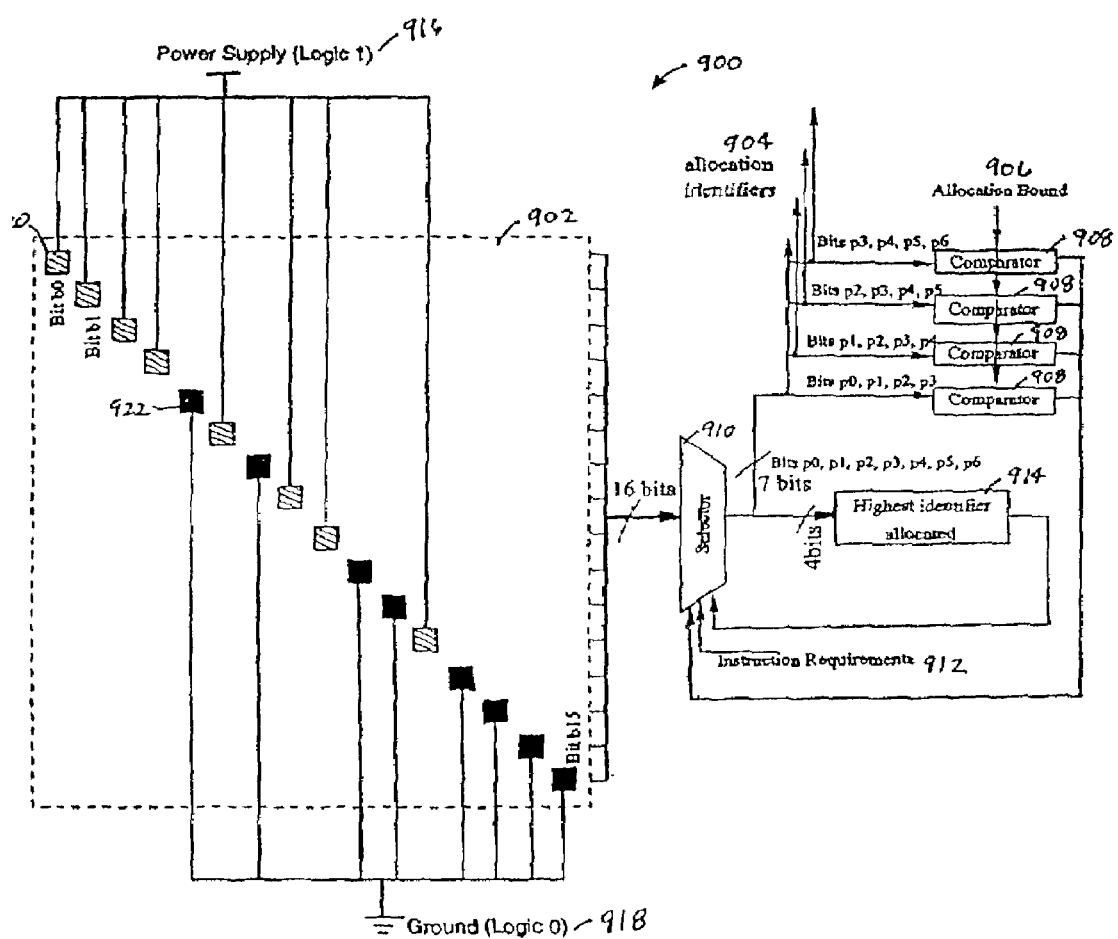
FIG. 9 is a block diagram of a pseudorandom sequence resource allocator in accordance with the present invention.

Now referring now to FIG. 9, a block diagram of a pseudorandom sequence resource allocator in accordance with the present invention will now be described. Included within resource allocator 900 are logic circuit 902, selector 910, and comparators 908. Resource allocator 900 operates in a manner similar to that of resource allocator 800 of FIG. 8 except that logic circuit 902 and identification circuit 914 generate the sequences, instead of having the sequences stored in an array. Since the pseudorandom sequence, i.e., a pattern of ones and zeros, is known at the time the circuit is designed, the pseudorandom sequence can be generated by logic circuit 902 instead of a storage array. The ones and zeros can be generated by connecting by connecting elements to the power supply 916 or the ground 918 depending on whether positive logic (logic one=power supply; logic zero=ground) or negative logic (logic one=ground; logic zero=power supply) is chosen. A example of positive logic is illustrated in FIG. 9 where the shaded blocks, e.g. 920, represent ones or the power supply 916 and the solid blocks, e.g. 922, represent zeros or the ground 918. As illustrated in FIGS. 8 and 9, a person skilled in the art could implement the present invention using a variety of logic circuits and storage arrays to generate the pseudorandom sequence.

The selector 910 of resource allocator 900 selects and outputs the generated resource identifiers that will be transmitted via allocation identifier output 904 to be allocated to instructions. For example, all 16 bits, b0 through b15, are connected to selector 910, which sends 7 bits, e.g. b0, b1, b2, b3, b4, b5 and b6, to comparators 906 in 4 sets, b0 through b3, b1 through b4, b2 through b5 and b3 through b6, and sends 4 bits to the highest identifier allocated 914, e.g. b3 through b6. The determination of selector 910 is based upon the instruction requirements 912, the highest identifier allocated 914, e.g. 4 bits comprising b3, b4, b5 and b6, and any overallocation signals generated by comparators 908. Allocation bound 906 is modified upon the deallocation of resources to reflect resources made available by instructions completed in the previous cycle. Comparators 908 can then utilize the allocation bound 906 and the current potentially allocated resource identifiers 904 to generate an overallocation signal so that allocation of resources and instruction decoding can be stalled.

The resource allocators for various reorder buffer specifications were modeled in Verilog and synthesized in Synopsys targeting the LSI Logic's 3.3v 610 TM-P Cell-Based 0.29μ ASIC library. The results correspond to the highest level of optimization that Synopsys could perform to minimize critical paths. Four-ported and eight-ported reorder buffer designs were implemented using buffer sizes of 16, 64 and 128 entries. Results from the implementation of the resource allocator using partially-stored LFSR sequences as shown in FIG. 7 confirmed that the serial nature of the circuitry is a performance limiter. Accordingly, only the design characteristics of the partially-stored numeric sequencer (FIG. 5), the fully-stored numeric sequencer (FIG. 6) and the fully-stored pseudorandom sequencer (FIG. 8) are compared below in Table III.

Table III lists the results of best timing optimizations for the three reorder buffer specifications described in reference to FIGS. 5, 6 and 8. It can be clearly seen that the fully-stored pseudorandom sequencer has better timing compared to the other two. In particular, the fully-stored pseudorandom sequencer is, on an average, 17% faster than the partially-stored numeric sequencer. In contrast, the fully-stored pseudorandom sequencer requires 1.1 to 2.2 times more area than the partially-stored numeric sequencer. The fully-stored numeric sequencer requires greater area usage and yields mediocre timing characteristics. Note that the clock rates in Table III are based on a 0.29μ process technology, so these rates would be increased by using a state-of-the-art process technology. In addition, there are many circuit tricks that can be adopted to optimize the critical paths and achieve a higher clock rate.

TABLE III

Result of synthesis of various resource allocators

| Reorder Buffer Specification | Design Characteristics | Partially-stored Numeric Sequencer (FIG. 5) | Fully-stored Numeric Sequencer (FIG. 6) | Fully-stored Pseudorandom Sequencer (FIG. 8) |
|---|---|---|---|---|
| Four-ported 4-bits 16-entries | Critical Path Timing (ns) (Max. Clock Speed (MHz)) Total Area* | 2.26 (442) 832.375 | 2.12 (471) 2074.85 | 1.85 (540) 930.175 |
| Four-ported 6-bits 64-entries | Critical Path Timing (ns) (Max. Clock Speed (MHz)) Total Area* | 2.53 (395) 1040.35 | 2.55 (392) 12977.075 | 2.19 (456) 2504.95 |
| Four-ported 7-bits 128-entries | Critical Path Timing (ns) (Max. Clock Speed (MHz)) Total Area* | 2.64 (378) 1482.65 | 2.69 (371) 30368.5 | 2.29 (436) 4840.5 |
| Eight-ported 7-bits 128-entries | Critical Path Timing (ns) (Max. Clock Speed (MHz)) Total Area* | 3.25 (307) 2630.5 | ** | 2.92 (354) 7722.325 |

*Equivalent gates: 1 two-input nand = 1 equivalent gate
**Synthesis proved to be extremely time consuming, so results are not available Table II also charts the degradation in the clock rates of the sequencers as the number of ports are increased. As the number of ports increases from four to eight, the maximum clock speed drops by about 18% for both the partially-stored numeric sequencer and the fully-stored pseudorandom sequencer. Even with eight ports, the use of a fully-stored pseudorandom sequencer will boost the clock by 15–20%.

FIG. 10 shows the plot of clock frequency of the three sequencers for different number of entries of four-ported reorder buffer. The performance of the partially-stored numeric sequencer is shown by line 1002. The performance of the fully-stored numeric sequencer is shown by line 1004. The performance of the fully-stored pseudorandom sequencer is shown by line 1006. The figure clearly shows that the fully-stored pseudorandom sequencer (line 1006) is superior in timing characteristics to both the fully-stored and partially-stored implementations of the numeric sequencer. As previously discussed, this improvement is possible because of the unique properties of the chosen pseudorandom sequence.

While the invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is, therefore, intended that the appended claims encompass any such modifications or embodiments.

What is claimed is:

1. An apparatus for allocating one or more resources within a microprocessor to a decoded instruction, the apparatus comprising:
    a sequence generator within the microprocessor that generates one or more resource identifiers using at least a portion of a pseudorandom sequence, each resource identifier corresponding to one of the resources within the microprocessor; and
    a resource identifier selector within the microprocessor coupled to the sequence generator, the resource identifier selector determining how many of the resource identifiers, if any, are required by the decoded instruction and selecting one or more of the resource identifiers for allocation to the decoded instruction, and whenever the one or more resources are not allocatable, generating a decoder stall signal.

2. The apparatus as recited in claim 1, wherein the resource identifier selector determines how many of the resource identifiers, if any, are required by the decoded instruction based on an instruction requirements signal received from an instruction decode unit.

3. The apparatus as recited in claim 1, further comprising a buffer including two or more buffer entries wherein each resource within the microprocessor comprises one of the buffer entries.

4. The apparatus as recited in claim 3, wherein the buffer comprises a reorder buffer, a load buffer or a store buffer.

5. The apparatus as recited in claim 1, wherein the resource identifier selector further comprises:
    one or more comparators coupled to the resource identifier selector and configured to compare a selected resource identifier to an allocation bound and issue a control signal in response to the comparison; and
    a selector coupled to the one or more comparators and the resource identifier selector.

6. The apparatus as recited in claim 1, wherein the resource identifier selector further comprises:
    one or more comparators coupled to the resource identifier selector and configured to compare a selected resource identifier to an allocation bound and issue a control signal in response to the comparison; and
    a variable shifter coupled to the one or more comparators and the resource identifier selector.

7. The apparatus as recited in claim 1, wherein the resource identifier selector further comprises:
    one or more comparators coupled to the resource identifier selector and configured to compare a selected resource identifier to an allocation bound and issue a control signal in response to the comparison:
    a selector coupled to the one or more comparators and the resource identifier selector; and
    a highest identifier allocation circuit coupled to the selector.

8. The apparatus as recited in claim 1, wherein the sequence generator further comprises:
    a logic circuit coupled to the resource identifier selector; and
    a storage array coupled to the logic circuit and the resource identifier selector.

9. The apparatus as recited in claim 1, wherein the sequence generator further comprises a storage array coupled to the resource identifier selector.

10. The apparatus as recited in claim 1, wherein the sequence generator further comprises a logic circuit coupled to the resource identifier selector.

11. The apparatus as recited in claim 1, wherein the portion of a pseudorandom sequence comprises a first resource identifier from within the pseudorandom sequence.

12. The apparatus as recited in claim 11, wherein the resource identifier selector comprises means for generating a second resource identifier from within the pseudorandom sequence based upon the first resource identifier.

13. The apparatus as recited in claim 1, wherein the sequence generator comprises a storage array and the portion of the pseudorandom sequence comprises a portion of each resource identifier within the pseudorandom sequence stored as elements within the storage array.

14. The apparatus as recited in claim 13, wherein the portion of each resource identifier within the pseudorandom sequence comprises a least significant bit of each resource identifier within the pseudorandom sequence.

15. The apparatus as recited in claim 13, wherein the resource identifier selector comprises a variable shifter configured to shift elements of the storage array and the resource identifier selector is configured to index the elements within the storage array.

16. The apparatus as recited in claim 1, wherein the sequence generator comprises a logic circuit and the portion of a pseudorandom sequence comprises a portion of each resource identifier within the pseudorandom sequence stored as elements within the storage array.

17. The apparatus as recited in claim 16, wherein the portion of each resource identifier within the pseudorandom sequence comprises a least significant bit of each resource identifier within the pseudorandom sequence.

18. The apparatus as recited in claim 16, wherein the resource identifier selector comprises a selector and a circuit to determine the highest identifier allocated configured to shift elements of the storage array and the resource identifier selector is configured to index the elements within the storage array.

19. The apparatus as recited in claim 1, wherein the one or more resources comprise one or more reorder buffer entries.

20. A method for allocating one or more resources within a microprocessor to a decoded instruction, the method comprising the steps of:
    generating one or more resource identifiers using at least a portion of a pseudorandom sequence, each resource identifier corresponding to one of the resources within the microprocessor;
    determining how many of the resource identifiers, if any, are required by the decoded instruction;
    selecting one or more of the resource identifiers for allocation to the decoded instruction; and
    generating an instruction decode stall signal in response to a determination that the resource within the microprocessor corresponding to the selected resource identifier is not allocatable.

21. The method as recited in claim 20, wherein the step of determining how many resource identifiers, if any, are required by the decoded instruction is based on an instruction requirements signal received from an instruction decode unit.

22. The method as recited in claim 20, further comprising the step of comparing a selected resource identifier to an allocation bound and issuing a control signal in response to the comparison.

23. The method recited in claim 20, wherein the portion of the pseudorandom sequence comprises a portion of each resource identifier within the pseudarandom sequence stored as elements within a storage array.

24. The method as recited in claim 23, wherein the portion of each resource identifier within the pseudorandom sequence comprises a least significant bit of each resource identifier within the pseudorandom sequence.

25. The method as recited in claim 20, further comprising:
storing the portion of the pseudorandom sequence as elements within a storage array; and
the selecting step comprises the steps of shifting the elements of the storage array and indexing the demerits of the storage array in response to the shifting.

26. The method as recited in claim 20, wherein the selecting step comprises the steps of:
identifying a most recently associated resource identifier from within, the pseudorandom sequence; and
selecting a resource identifier from within the pseudorandom sequence based upon the most recently associated resource identifier.

27. The method as recited in claim 20, wherein the selecting step comprises the steps of:
determining a requirement of the decoded instruction for a resource within the microprocessor, and
associating the selected resource identifier with the decoded instruction in response to the determination.

28. The method as recited in claim 20, wherein the selecting step comprises the steps of:
comparing the selected resource identifier to an allocation bound to determine whether a resource within the microprocessor corresponding to the selected resource identifier is allocatable; and
associating the selected resource identifier with the decoded instruction in response to the determination.

29. The method as recited in claim 28, further comprising the step of modifying the allocation bound in response to a deallocation of a resource within the microprocessor.

30. The method as recited in claim 20, wherein the one or more resources comprise one or more reorder buffer entries.

31. A system comprising:
a memory storage device;
a bus coupled to the memory storage device;
a microprocessor coupled to the bus, comprising a resource allocator for allocating one or more resources within the microprocessor to a decoded instruction; and
the resource allocator comprising:
a sequence generator that generates one or more resource identifiers using at least a portion of a pseudorandom sequence, each resource identifier corresponding to one of the resources within the microprocessor; and
a resource identifier selector coupled to the sequence generator, the resource identifier selector determining how many of the resource identifiers, if any, are required by the decoded instruction and selecting one or more of the resource identifiers for allocation to the decoded instruction, and whenever the one or more resources are not allocatable to the decoded instruction, generating a decoder stall signal.

32. The system as recited in claim 31, wherein the resource identifier selector further comprises:
one or more comparators coupled to the resource identifier selector and configured to compare a selected resource identifier to an allocation bound and issue a control signal in response to the comparison; and
a selector coupled to the one or more comparators and the resource identifier selector.

33. The system as recited in claim 31, wherein the resource identifier selector further comprises:
one or more comparators coupled to the resource identifier selector and configured to compare a selected resource identifier to an allocation bound and issue a control signal in response to the comparison; and
a variable shifter coupled to the one or more comparators and the resource identifier selector.

34. The system as recited in claim 31, wherein the resource identifier selector further comprises:
one or more comparators coupled to the resource identifier selector and configured to compare a selected resource identifier to an allocation bound and issue a control signal in response to the comparison;
a selector coupled to the one or more comparators and the resource identifier selector; and
a highest identifier allocation circuit coupled to the selector.

35. The system as recited in claim 31, wherein the sequence generator further comprises:
a logic circuit coupled to the resource identifier selector; and
a storage ray coupled to the logic circuit and the resource identifier selector.

36. The system as recited in claim 31, wherein the sequence generator further comprises a storage array coupled to the resource identifier selector.

37. The system as recited in claim 31, wherein the sequence generator further comprises a logic circuit coupled to the resource identifier selector.

38. The system as recited in claim 31, wherein the one or more resources comprise one or more reorder buffer entries.

39. An apparatus for allocating one or more resources within the execution path of a microprocessor to a decoded instruction, the apparatus comprising:
a sequence generator within the microprocessor that generates one or more resource identifiers using at least a portion of a pseudorandom sequence, each resource identifier corresponding to one of the resources within the execution path of the microprocessor; and
a resource identifier selector within the microprocessor coupled to the sequence generator, the resource identifier selector determining how many of the resource identifiers, if any, are required by the decoded instruction and selecting one or more of the resource identifiers for allocation to the decoded instruction, and whenever the one or more resources are not allocatable to the decoded instruction, generating a decoder stall signal.

40. The apparatus as recited in claim 39, wherein the one or more resources comprise one or more reorder buffer entries.

* * * * *

UNITED STATES PATENT AND TRADEMARK OFFICE
CERTIFICATE OF CORRECTION

PATENT NO. : 7,107,434 B2  Page 1 of 1
APPLICATION NO. : 09/741616
DATED : September 12, 2006
INVENTOR(S) : John et al.

It is certified that error appears in the above-identified patent and that said Letters Patent is hereby corrected as shown below:

Column 8
Line 65, "Bit b0=0, Bit b1=0, ...and Bit b15=0" should read --...Bit b0=1, Bit b1=1, Bit b2= 1, Bit b3=1, Bit b4=0, Bit b5=1, Bit b6=0, Bit b7=1, Bit b8=1, Bit b9=0, Bit b13=0, Bit b14=0, Bit b15=0...--.

Column 9
Line 29, "...by connecting by connecting..." should read --...by connecting...--.

Column 10
Line 52, "...Table II..." should read --...Table III...--.

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,107,434 B2 |
| APPLICATION NO. | : 09/741616 |
| DATED | : September 12, 2006 |
| INVENTOR(S) | : Lizy Kurian John et al. |

It is certified that error appears in the above-identified patent and that said Letters Patent is hereby corrected as shown below:

Insert the following at column 1, line 4, before the paragraph entitled: "TECHNICAL FIELD OF THE INVENTION"

--STATEMENT REGARDING GOVERNMENT SPONSORED RESEARCH OR DEVELOPMENT

This invention was made with government support under 9796098 awarded by the National Science Foundation. The government has certain rights in the invention.--

Signed and Sealed this

Eleventh Day of May, 2010

David J. Kappos
*Director of the United States Patent and Trademark Office*